United States Patent
Nemeth-Csoka et al.

(10) Patent No.: US 8,649,901 B2
(45) Date of Patent: Feb. 11, 2014

(54) TRANSFER APPARATUS FOR WORKPIECE CARRIERS

(75) Inventors: Mihaly Nemeth-Csoka, Erlangen (DE); Guido Stöppler, Nürnberg (DE)

(73) Assignee: Siemens Aktiengesellschaft, München (DE)

( * ) Notice: Subject to any disclaimer, the term of this patent is extended or adjusted under 35 U.S.C. 154(b) by 1011 days.

(21) Appl. No.: 12/665,543

(22) PCT Filed: Jun. 18, 2008

(86) PCT No.: PCT/EP2008/057644
§ 371 (c)(1),
(2), (4) Date: Dec. 18, 2009

(87) PCT Pub. No.: WO2009/000710
PCT Pub. Date: Dec. 31, 2008

(65) Prior Publication Data
US 2010/0185320 A1    Jul. 22, 2010

(30) Foreign Application Priority Data

Jun. 22, 2007   (DE) .......................... 10 2007 028 903
Feb. 12, 2008   (DE) .......................... 10 2008 008 602

(51) Int. Cl.
    G06F 7/00    (2006.01)
(52) U.S. Cl.
    USPC ........................................................ 700/228
(58) Field of Classification Search
    USPC ................................................. 700/230, 228
    See application file for complete search history.

(56) References Cited

U.S. PATENT DOCUMENTS

| | | | |
|---|---|---|---|
| 6,011,508 A | 1/2000 | Clark et al. | |
| 6,370,447 B1 * | 4/2002 | Miyazaki | 700/230 |
| 6,499,701 B1 | 12/2002 | Clark | |
| 6,578,495 B1 | 6/2003 | Taylor et al. | |
| 6,781,524 B1 | 8/2004 | Clark et al. | |
| 6,873,882 B2 * | 3/2005 | Tachibana et al. | 700/230 |
| 7,035,714 B2 * | 4/2006 | Anderson et al. | 700/228 |
| 8,050,795 B2 * | 11/2011 | Dollens | 700/230 |
| 2005/0263369 A1 | 12/2005 | Mendenhall | |
| 2008/0234858 A1 * | 9/2008 | Dollens | 700/230 |
| 2010/0185320 A1 * | 7/2010 | Nemeth-Csoka et al. | 700/230 |

FOREIGN PATENT DOCUMENTS

| | | |
|---|---|---|
| DE | 37 02 248 A1 | 8/1987 |
| DE | 43 05 274 A1 | 9/1994 |
| DE | 69011744 T2 | 3/1995 |
| DE | 101 50 319 C1 | 5/2003 |
| DE | 10334736 A1 | 2/2005 |
| EP | 1 425 613 A1 | 6/2004 |

* cited by examiner

*Primary Examiner* — Ramya Burgess
(74) *Attorney, Agent, or Firm* — Henry M Feiereisen LLC

(57) ABSTRACT

In a transfer device for workpiece carriers (18), with a number of segments (10, 10', 10") in which a control unit (14, 14', 14") respectively activates a linear motor (12, 12', 12"), in a phase of the transfer of the workpiece carrier (18) from a first segment (10) to a neighbouring segment (10') synchronization of the linear motors (12, 12") is no longer effected on the basis of control commands of a central controller but instead the control unit (14) of the first segment (10) makes itself the master (S18) and subjugates the control unit (14') of the neighbouring segment (10') as the slave (S20). A position measuring device (22, 24) makes it possible for the master control unit (14) to carry out speed control for the workpiece carrier (18). The control unit (14') receives information on the commutation angle and the actual force value and can therefore issue the control commands to the associated linear motor (12') for the control process.

7 Claims, 2 Drawing Sheets

Force actual value
Commutation angle

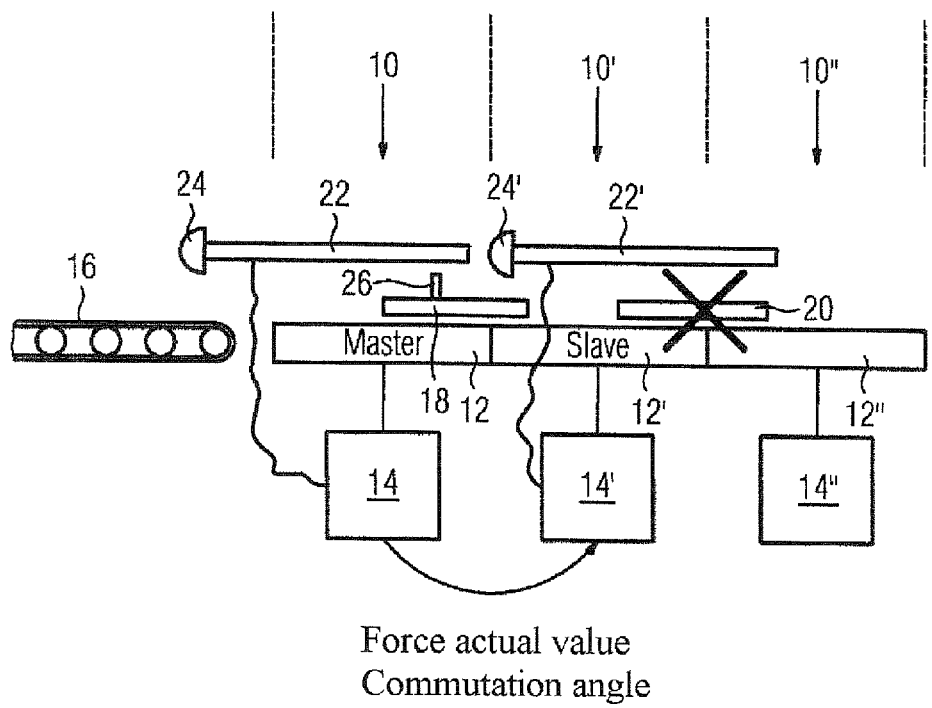

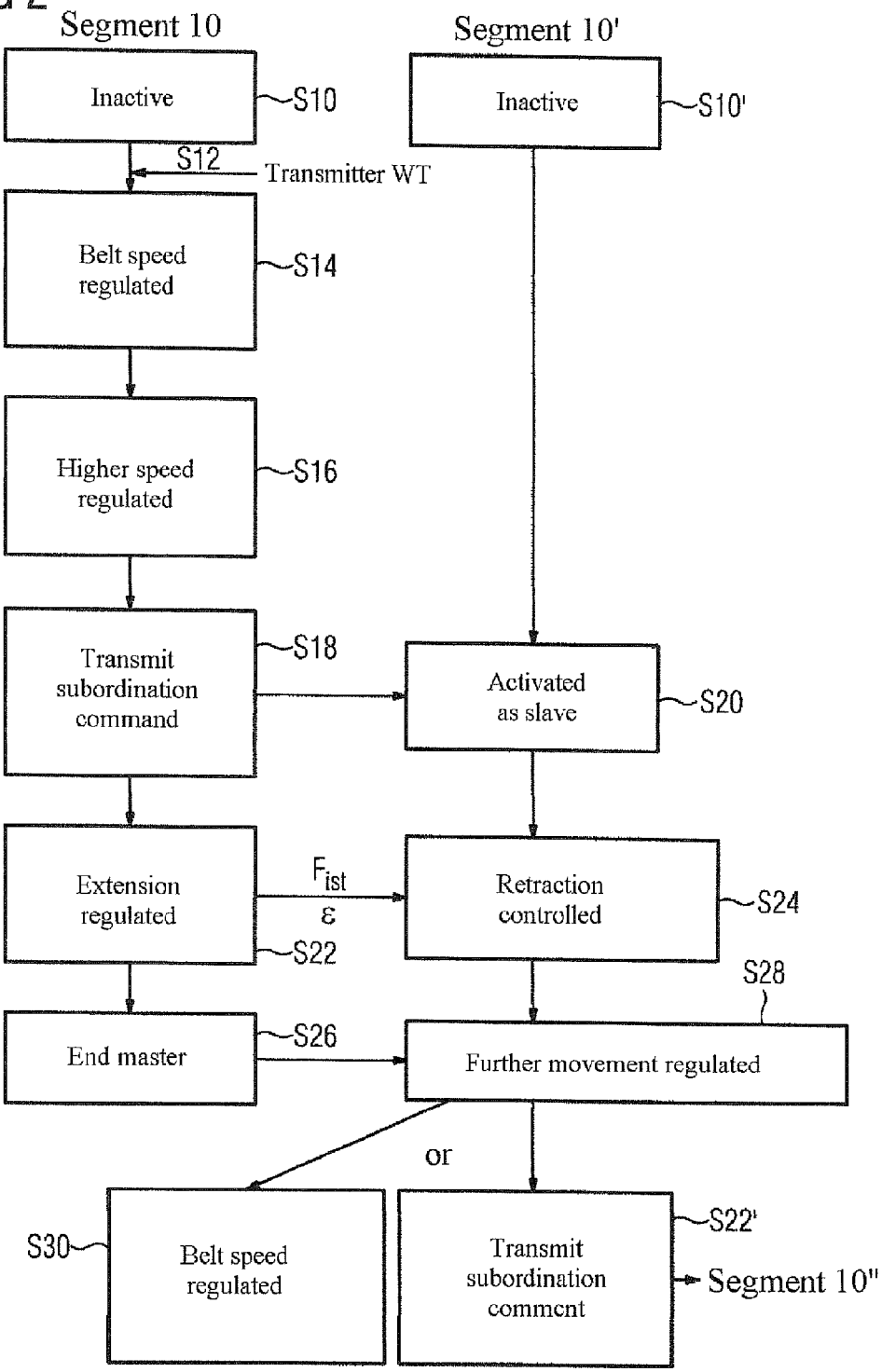

TRANSFER APPARATUS FOR WORKPIECE CARRIERS

The invention relates to a transfer apparatus for workpiece carriers. Transfer apparatuses such as these are generally known. By way of example, one transfer apparatus for workpiece carriers is described in DE 101 50 319 C1.

CROSS-REFERENCES TO RELATED APPLICATIONS

This application is the U.S. National Stage of International Application No. PCT/EP2008/057644, filed Jun. 18, 2008, which designated the United States and has been published as International Publication No. WO 2009/000710 and which claims the priorities of German Patent Applications, Ser. No. 10 2007 028 903.2, filed Jun. 22, 2007, and 10 2008 008 602.9, filed Feb. 12, 2008, pursuant to 35 U.S.C. 119(a)-(d).

BACKGROUND OF THE INVENTION

The present application relates to a segmented transfer apparatus. In particular, the transfer apparatus should have at least two mutually adjacent segments. Each segment has a long stator linear motor and a control unit for controlling this linear motor.

In each of the segments, the associated control unit can ensure transportation of the workpiece carrier by applying a suitable current, typically an alternating current, to the linear motor. A difficulty arises in the transfer phase of the workpiece carrier from one segment to the other segment. This is because the two linear motors in the adjacent segments must then be synchronized. If the alternating current is sinusoidal, then an angle can be associated with each time, the so-called commutation angle. It is now important for the two linear motors to have currents applied to them for which the commutation angle is as accurately identical as possible. Furthermore, the total force caused by the currents should be constant during the transfer from one segment to the adjacent segment.

Until now, the synchronization has been carried out by a central control device instructing the control units of the individual segments to behave in a specific manner, by means of suitable control signals. Technically, the central control device defines the commutation angle and signals this to the two control units of the adjacent segments.

The use of a central control device does not make it possible to regulate the movement of the workpiece carrier. A nominal speed can be defined, but the actual speed then results on the basis of the control signals. It has been found that only a restricted speed range exists: the speed must be such that the static friction is overcome, while on the other hand, however, the workpiece carrier is prevented from tipping over. It is difficult to use control signals to accurately achieve a workpiece carrier movement at the optimum speed. The central control also means that a higher current level frequently occurs that is actually necessary, thus leading to the system heating.

SUMMARY OF THE INVENTION

The object of the invention is to develop a transfer apparatus for workpiece carriers such that the workpiece carriers can be transferred from one segment to the adjacent segment reliably and nevertheless at as high a speed as possible.

The object is achieved by a transfer apparatus for a workpiece carrier having at least two mutually adjacent segments, with each segment having a long stator liner motor and a control unit for controlling the linear motor. According to the invention, a master-slave relationship can be created between two adjacent segments. At least the control unit of a first of the segments is therefore designed to treat the control unit of an adjacent segment as a subordinate control unit (slave) and, of course and conversely, the control unit of the adjacent segment must then be designed such that it acts as a subordinate control unit (slave) to the control unit of the first segment (master).

The master-slave relationship preferably does not exist all the time but can be set up for the specific situation when the workpiece carrier is being transferred from the first segment to the adjacent segment. This can be done by an appropriate command, by means of which the control unit of the first segment makes the control unit of the adjacent segment a subordinate control unit.

In particular, the master-slave relationship can be expressed by the control unit of the first segment being designed to supply signals to the control unit of the adjacent segment. Because of the subordination of the control unit of the adjacent segment, these signals can be regarded in particular as control signals, when they are taken into account for the drive of the respective linear motor.

Since the first control unit is given a superordinate role and the other control unit is given a subordinate role to it, the first control unit can be relieved of the load of the central control device, that is to say it can autonomously cause the movement of the workpiece carrier. For this purpose, it is advantageous for the first segment to have a position measurement apparatus for the measurement of the position of a workpiece carrier, because the control of the linear motor of its own segment and of the linear motor of the adjacent segment can then be oriented to the actual situation, specifically actually the position of the workpiece carrier. (The position measurement apparatus must, of course, supply the measurement signals to the control unit which is coupled to it).

The speed of the workpiece carrier can also be determined in the case of a suitable position measurement apparatus which allows the position of the workpiece carrier to be measured at different points. However, it is then also possible to regulate the speed of the workpiece carrier as long as this is being moved by the linear motor of the first segment or is also being moved by the linear motor of the first segment at least together with the linear motor of the adjacent segment.

A large number of individual position sensors may be used to determine the speed of the workpiece carrier. However, a magnetostrictive sensor is preferably used, which has an extended part coupled to the linear motor. This can be designed such that this extended part can be used to detect movement of a part which is connected to the workpiece carrier to be transported (and in particular a part which is not extended, that is to say a part that is effectively in the form of a point). In particular, the extended part can deduce the position of the workpiece carrier as a function of the time, and therefore also of the speed.

The decentralization of the control of the movement of the workpiece carriers, specifically the displacement of this function to the master control unit, can result in conflicts occurring when a number of workpiece carriers are being transported. This is the case in particular when the workpiece carriers can be moved in two opposite directions. In this situation, it is possible, in the case of a sequence of three segments, for one workpiece carrier to be located in a first and a third segment, and for it to be transported from both of these segments to the second segment. However, the control unit of the second segment cannot simultaneously be in a slave relationship with the control units of the first and of the third segments. A central control device therefore preferably carries out coordination. At the least, this should detect the segment in which workpiece carriers are located, and can then allocate which control unit must carry out the master role and which must not.

The invention also includes a method for transportation of workpiece carriers in a transfer apparatus of the type according to the invention, having a position measurement apparatus and the capability for speed regulation. The method relates in particular to the phase in which a workpiece carrier is transferred from a first segment to its adjacent segment. At least in this phase, the control unit of the first segment should regulate the speed of the workpiece carrier on the basis of the signals obtained by the position measurement apparatus. It applies suitable currents to its own motor. Since the speed is also governed by the linear motor of the adjacent segment during the transfer phase, the control unit of the first segment applies signals to the control unit of the adjacent segment such that it is possible only to drive the linear motor of the adjacent segment. This means that no transmitter signals need be evaluated in the second segment, and that, in addition, no signals need be sent from a central control device to the second segment. The control unit of the first segment determines the speed of the workpiece carrier by the driving of its own linear motor and the indirect driving of the linear motor of the adjacent segment, by means of the signals sent to the control unit of the adjacent segment.

The master-slave relationship is therefore set up in the transfer phase and appears in a form such that the master carries out regulation, and the slave is controlled.

To allow the control unit of the adjacent segment to apply the suitable currents to the associated linear motor, it is sufficient for the signals emitted to the control unit of the adjacent segment to provide information about an instantaneous force actual value and/or a commutation angle. The current to the linear motors can then be synchronized by the control unit of the adjacent segment orienting itself to the current flow to the linear motor in the first segment, in particular defining the same commutation angle. The instantaneous force actual value can then be used for the control unit to apply to the linear motor a current of such an amplitude that the workpiece carrier is moved at a constant speed during the transfer.

In numerous transfer apparatuses, the segments are coupled to the linear motors on conveyor belts. The workpiece carriers are supplied to the segment arrangement on these conveyor belts. When a workpiece carrier arrives, the linear motor of that segment to which the conveyor belt leads should continue the movement of the workpiece carrier in the transfer. The autonomous control of the first segment by the control unit when the conveyor belt leads to this first segment means that the control unit itself can also control the speed when and for as long as the adjacent segment of the transfer apparatus need not yet be included. In particular, speed regulation can actually start in a phase in which the workpiece carrier is being transferred from the conveyor belt to the first segment, preferably at a conveyor belt conveyor speed which is detected (with the aid of the position measurement apparatus) in order that the workpiece carrier will continue to move at a constant speed. After completion of this initial phase, regulation then takes place at a speed which is not the same as the conveyor speed, and is preferably higher than the conveyor speed. This different speed should be implemented at the latest in the transfer phase to the adjacent segment.

As already mentioned above, a central control device can coordinate the transportation of a plurality of workpiece carriers. This can be made possible by the control units of those segments at which a workpiece carrier arrives or is present, sending a request as to whether this workpiece carrier may be transferred to an adjacent segment. It is then the task of the central control device to respond to this request: it sends an enable signal when the workpiece carrier that is present can be transported. The enable signal should be essential in order that a control unit initiates the transfer phase to the adjacent segment in which it deals with the control unit of the adjacent segment as a subordinate control unit. This means that, in particular, the master-slave relationship is set up by the enable signal.

BRIEF DESCRIPTION OF THE DRAWING

A preferred embodiment of the invention will be described in the following text with reference to the drawing, in which FIG. 1 shows, schematically, components of a transfer apparatus according to the invention, as used for a method according to the invention, FIG. 2 shows a step sequence for the transportation of a workpiece carrier according to one embodiment of the method according to the invention.

DETAILED DESCRIPTION OF PREFERRED EMBODIMENT

A transfer apparatus which is illustrated schematically in FIG. 1 has a plurality of segments 10, 10' and 10". Each segment has a long stator linear motor 12, 12' and 12", respectively, and a respective control unit 14, 14' and 14". Workpiece carriers are supplied to the segment arrangement at the side of the segment 10, via a conveyor belt 16. FIG. 1 shows one workpiece carrier 18. The invention as described in the following text operates reliably only when in each case only one workpiece carrier is located in each of the segments 10, 10' and 10", and it is therefore impossible for a workpiece carrier 20 to be transported in addition to the workpiece carrier 18, as shown in FIG. 1.

In order to operate without any disturbances during the transfer phase, as illustrated in FIG. 1, of the workpiece carrier 18 from the first segment 10 to this adjacent segment 10', the linear motors 12 and 12' must be synchronized. In the present case, this is not done by a central controller. In fact, when the workpiece carrier 18 is to be transported to the adjacent segment 10', the control unit 14 in the first segment 10 automatically makes itself the master, and the control unit 14' of the adjacent segment 10' the slave. The control unit 14' is therefore subordinate to the control unit 14. For synchronization, the control unit 14 of the first segment 10 transmits information about the commutation angle to the control unit 14'. In addition, information is transmitted about the force actual value to the control unit 14' from the control unit 14. The control unit 14' is therefore able to apply a current to the linear motor 12' such that the workpiece carrier 18 is transferred smoothly from the first segment 10 to the adjacent segment 10'.

This is all done in the course of speed regulation. In order to allow the speed of the workpiece carrier 18 to be regulated, it must be possible to detect this. A two-part measurement apparatus is used for this purpose: a magnetostrictive measurement element 22 or 22' is provided on the respective segments 10 and 10'. Current pulses are injected into this magnetostrictive measurement element 22 or 22' via a device 24. Each workpiece carrier 18 is now provided with a permanent magnet 26 in the form of a rod. When the permanent magnet 26 slides past the magnetostrictive measurement device, it causes torsion in the latter. The structure-borne pulses associated with this produce a signal at the device 24 designed according to this invention. The influence is dependent on the location of the permanent magnet 26, so that the position of the workpiece carrier 18 can be detected. Because of the extent of the magnetostrictive measurement device 22, repeated position measurement is possible, and therefore a speed measurement. This allows regulation at a predetermined speed, which is performed by the control unit 14. As a result of the subordination of the control unit 14' to the control unit 14, the linear motors 12 and 12' are synchronized and operate as a single motor.

The transportation of a workpiece carrier 18 will be explained in detail with reference to FIG. 2.

As long as no workpiece carriers reach the segments 10 and 10', they remain inactive, see steps S10 and S10', respectively. Since the magnetostrictive measurement device 22 projects beyond the linear motor 12 in the direction of the conveyor belt 16, it detects an incoming workpiece carrier ("WT"). Since the transmitter detects the arrival of the workpiece carrier, corresponding to step S12 the segment 10 becomes active. The speed of the workpiece carrier on the conveyor belt 16 is detected, and the control unit 14 drives the linear motor 12 such that this belt speed is maintained even when the workpiece carrier 18 enters the segment 10. During the transfer from the conveyor belt 16 to the segment 10, the belt speed is therefore also regulated, see step 514.

After completion of the transfer, the manipulated variable is changed, and regulation takes place at a higher nominal speed, see step S16. The workpiece carrier 18 passes through the segment 10 and comes within range of the adjacent segment 10'. Current must now also be applied to the linear motor 12'. In order to activate the segment 10', the control unit 14 sends a subordination command to the control unit 14', corresponding to step S18. This control unit 14' is activated as a slave, see step S20. As described above, the workpiece carrier 18 is then transferred from the first segment 10 to the adjacent segment 10'. During the transfer, regulation still takes place at the higher speed, as in step S16. The control unit 14 therefore regulates the departure of the workpiece carrier from the segment 10, see step S22. In contrast, the entry to the adjacent segment 10' is controlled from the point of view of the unit 14', see step S24. As mentioned above, the force actual value $F_{act}$ and the commutation angle c are transmitted as control signals. Once the transfer of the workpiece carrier to the segment 10' has been completed, the control unit 14 ends its master role, see step S26. The control unit 14' of the adjacent segment 10' now takes over the further movement, see step S28: since the segment 10' also has a position measurement apparatus with the elements 22' and 24', the further movement can also be carried out by the unit 14'.

If, in a modification of FIG. 1, the adjacent segment 10' merges into a further conveyor belt, it is possible to carry out regulation at the measured or supposed belt speed corresponding to step S30. In the case of the configuration shown in FIG. 1, in contrast, the steps S18, S20, S22, S24 and S26 can be repeated, with the segment 10' assuming the role of the segment 10, and the segment 10" assuming the role of the segment 10'; a subordination command is therefore sent, corresponding to step S22', from the unit 14' to the segment 10", and in particular to its control unit 14". The control unit 14' therefore becomes the new master and the control unit 14" the new slave, and the new master can carry out speed regulation, in the course of which the new slave receives control commands.

What is claimed is:

1. A transfer apparatus for a workpiece carrier, comprising:
a first upstream segment having a first long stator linear motor and a first control unit for controlling the first linear motor, said first control unit of the upstream segment being dynamically designated a master controller, and
an adjacent second segment located downstream of the first segment in a transport direction and having a second long stator linear motor and a second control unit for controlling the second linear motor, said second control unit of the downstream segment being dynamically designated a slave controller,
wherein the first and second control units operate in absence of a central controller, wherein the second control unit controls the second linear motor in response to information received exclusively from the first control unit, said information comprising at least one of a force value and a commutation angle, so as to transfer the workpiece carrier smoothly from the first segment to the second segment.

2. The transfer apparatus of claim 1, wherein the first control unit transmits a command to the second control unit to designate the second control unit as a slave unit.

3. The transfer apparatus of claim 1, wherein the first control unit transmits a control signal to the second control unit.

4. The transfer apparatus of claim 1, wherein at least the first segment comprises a position measurement apparatus for measuring a position of the workpiece carrier.

5. The transfer apparatus of claim 4, wherein the first control unit receives signals from the position measurement apparatus and regulates a speed of a workpiece carrier, which moves in conjunction with or is moved by the first long stator linear motor, based on the received signals.

6. The transfer apparatus of claim 5, wherein the position measurement apparatus comprises a magnetostrictive sensor with an extended first part that is coupled to the first long stator linear motor and configured to detect a movement of a second part connected to the workpiece carrier.

7. The transfer apparatus of claim 1, further comprising a central control device which detects a segment in which a workpiece carrier is located.

* * * * *